Patented Jan. 3, 1950

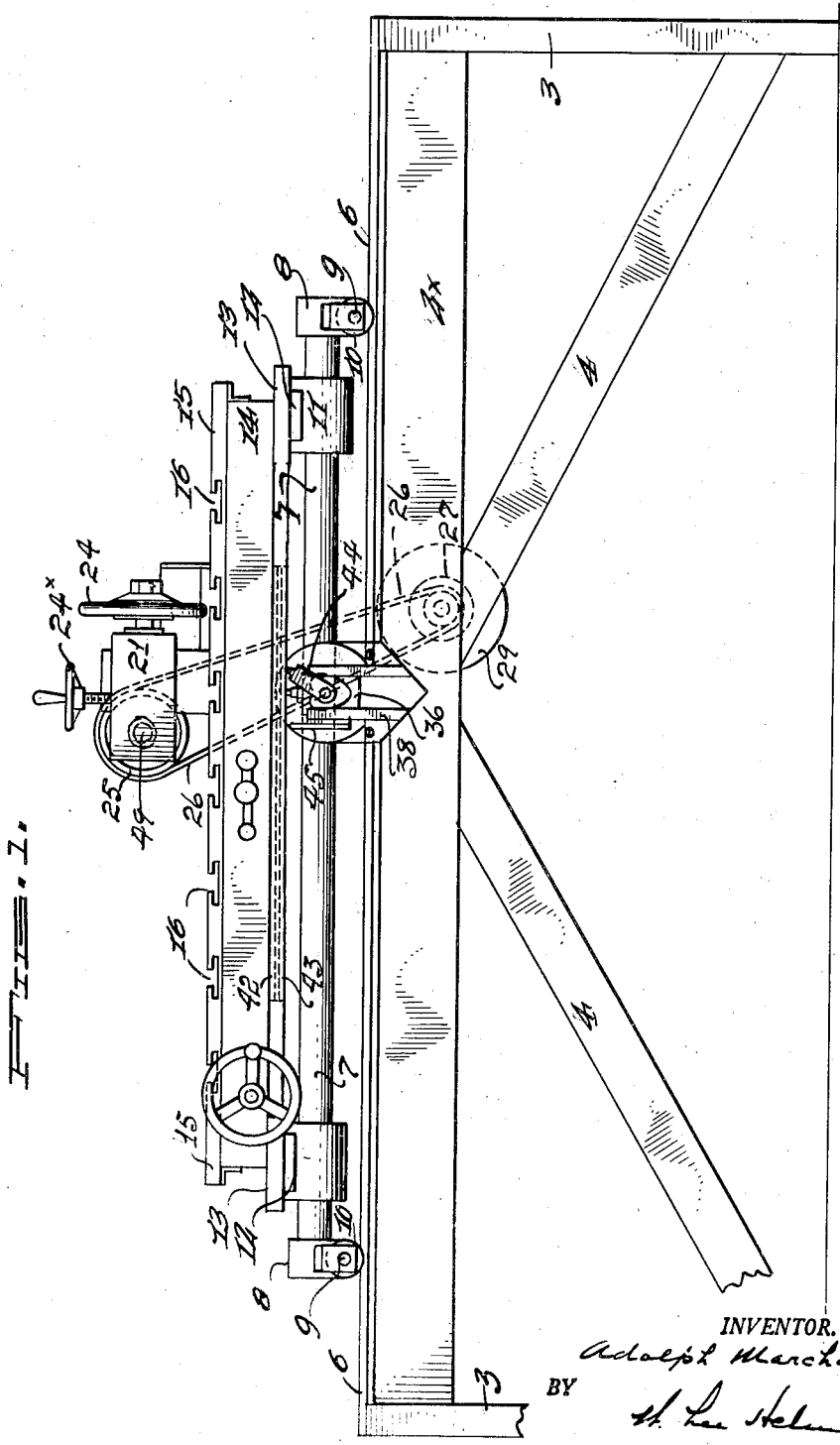

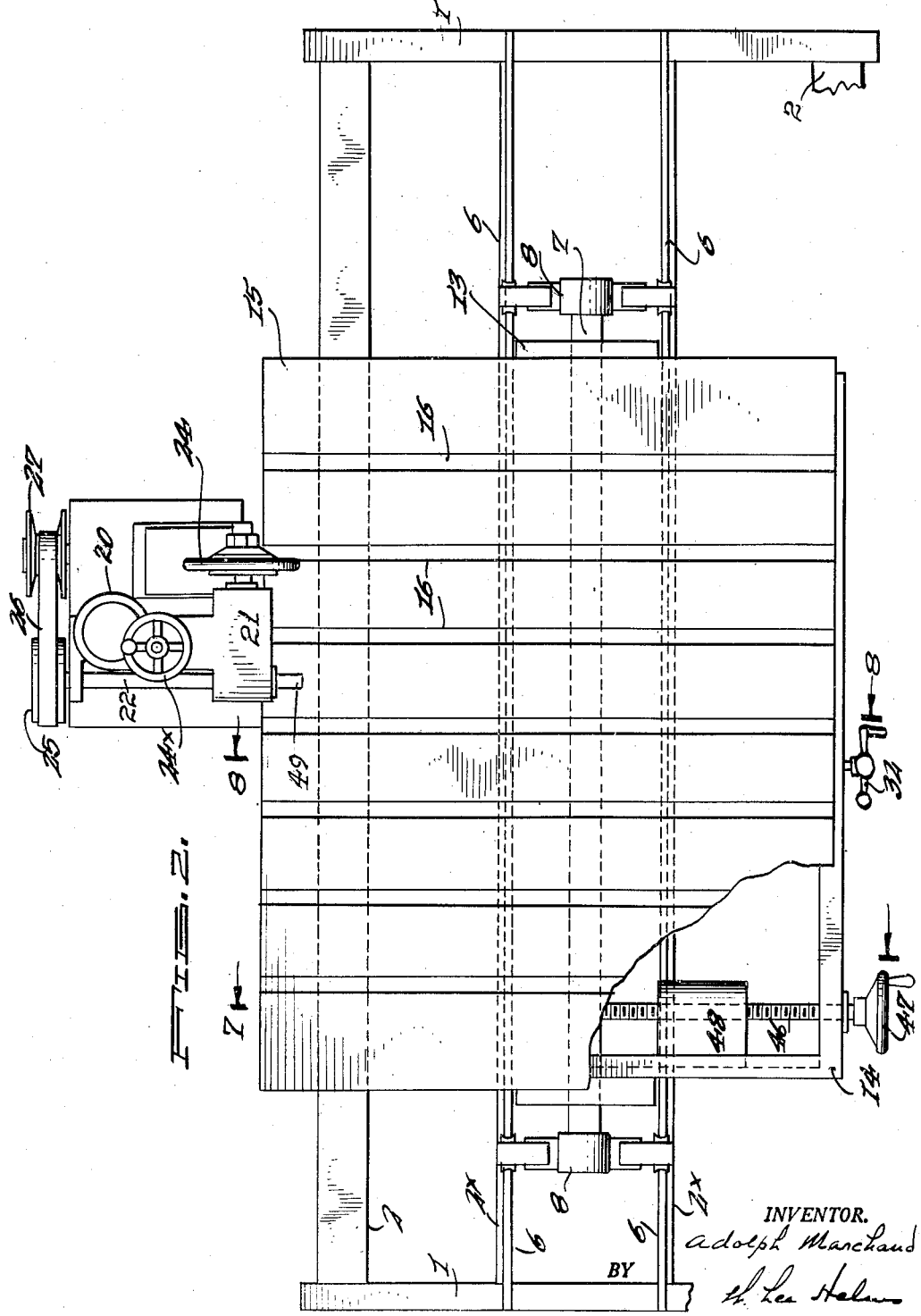

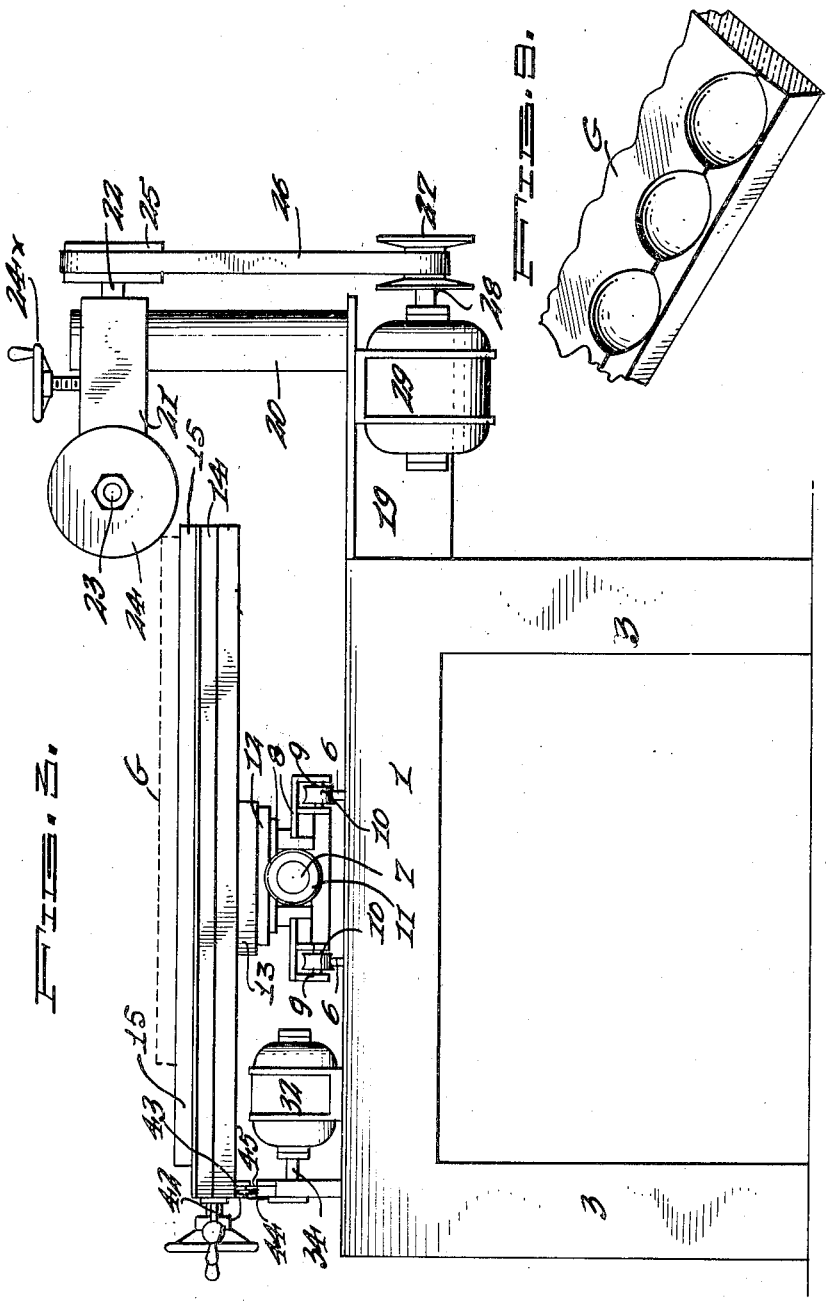

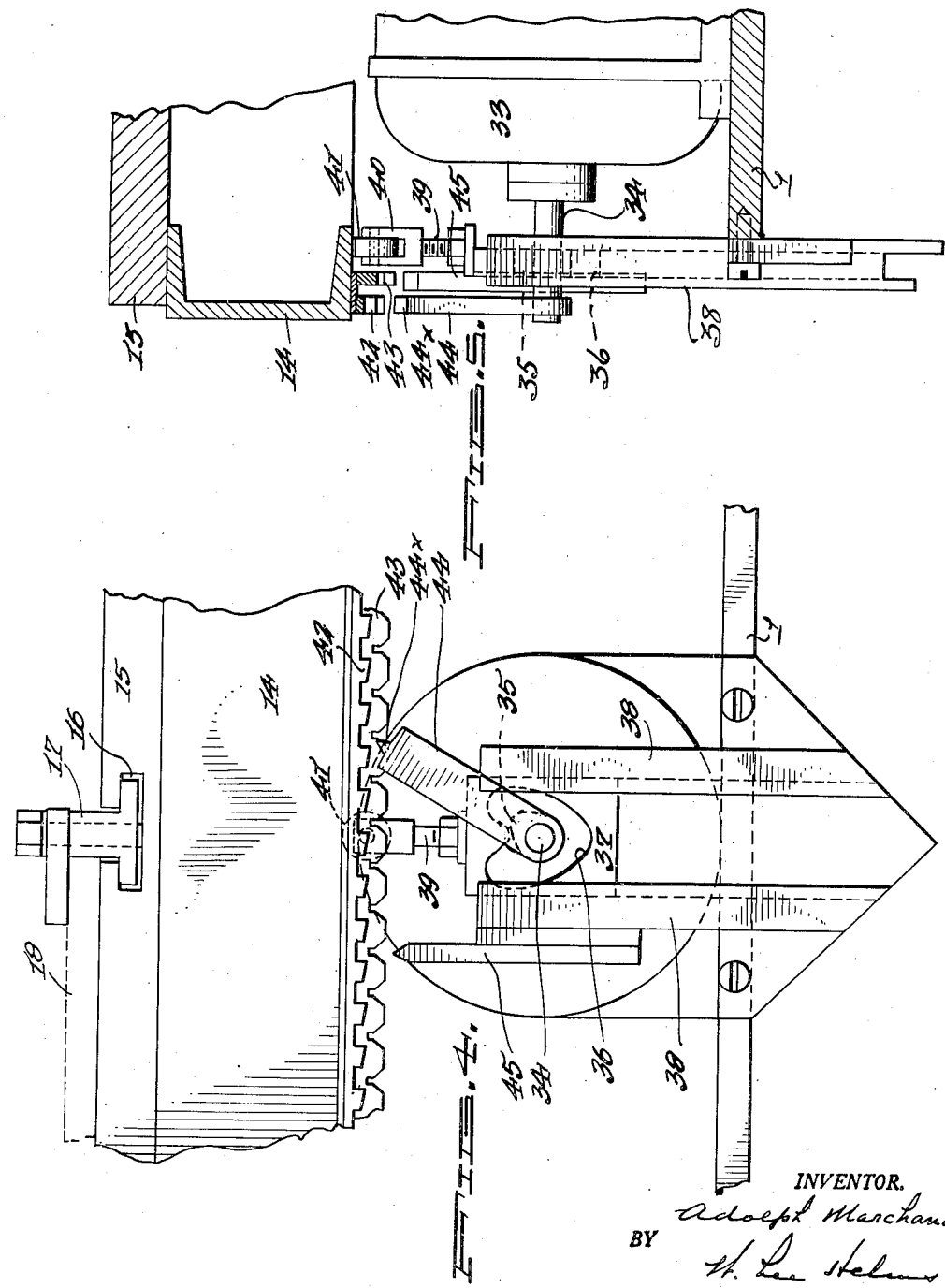

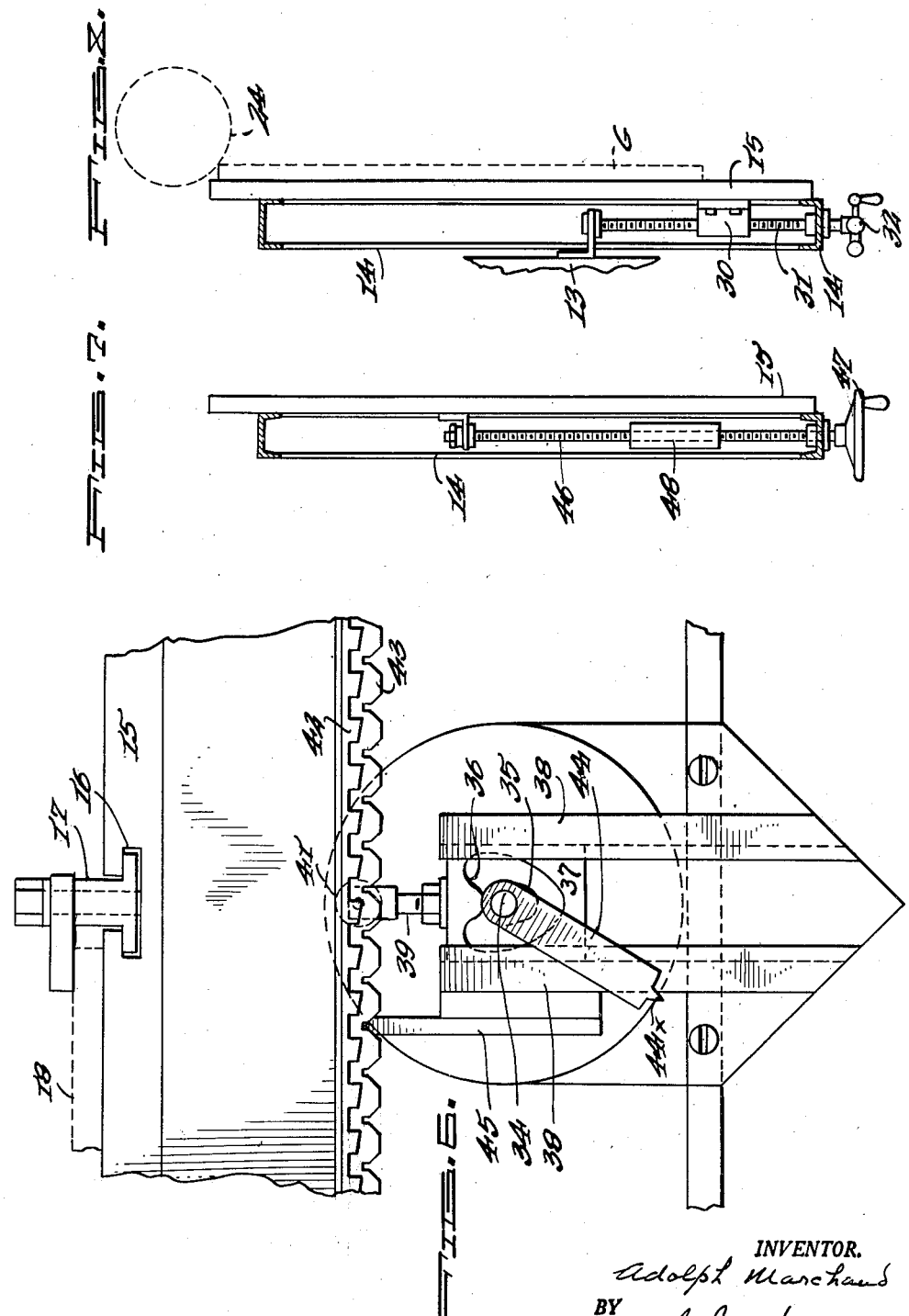

2,493,540

UNITED STATES PATENT OFFICE 2,493,540

AUTOMATIC MACHINE FOR DECORATING GLASS

Adolph Marchand, Jackson Heights, N. Y.

Application April 17, 1946, Serial No. 662,687

3 Claims. (Cl. 51—72)

The object of the present invention is to provide an automatic machine particularly adapted for decorating the marginal edges of mirrors or the like, but not limited thereto. One purpose of the machine is to automatically cut a succession of "punties" about the marginal edges of mirrors. A "puntie" is a small, rounded profile or notch on the edge on the surface of a plate glass.

The machine is characterized by the provision of a support upon which a glass plate or plates may be clamped, a grinding element, and automatically operated means for moving the support relatively to the grinding device step by step in accordance with the particular operation to be performed. In the cutting of "punties," the support is automatically moved step by step and is tilted after each step movement to carry an edge of the glass plate into contact with the grinding device and for a predetermined time sufficient for the work to be performed.

The invention will be described with reference to the accompanying drawings, in which:

Figure 1 is a front elevation, partly broken away, showing an embodiment of the invention;

Figure 2 is a plan view of said embodiment, partly broken away;

Figure 3 is a side elevation showing in dotted lines the position of a glass plate during a cutting operation at the upper marginal edge thereof;

Figure 4 is an enlarged detailed elevation showing in dotted lines part of the glass plate clamped to the support or table and certain of the table actuating and registration elements;

Figure 5 is a transverse vertical section taken on the line 5—5 of Figure 4;

Figure 6 is a view similar to Figure 4 showing the position of actuating elements and the registration device during a cutting operation, in the cutting of a "puntie";

Figure 7 is a vertical section taken transversely generally on the line 7—7 of Figure 2;

Figure 8 is a transverse vertical section taken generally on the line 8—8 of Figure 2;

Figure 9 is a fragmentary view showing a section of the glass plate having three "punties" cut therein.

Referring to the drawings, the machine consists of a main, tilting frame having horizontal supports 1 and longitudinal horizontal supporting bars 2 and 2x, forming an upper frame structure, the frame being reinforced by struts 3 and 4.

Extending longitudinally of the main frame at its upper surface are spaced track members 6 for receiving a carriage, the latter being best shown in Figures 1, 2 and 3.

The carriage consists of a longitudinally extending rigid rod or bar 7 carrying at each end a bracket 8 which in turn supports the axles 9 for wheels 10, the latter being supported by the track 6. The specific form of the wheeled arrangement is not claimed herein and may be varied as desired.

Held upon the bar 7 are spaced yoke members 11 which carry horizontal base member 12 upon which is supported a carrier 13 for a table supporting the tilting and moving subframe 14.

The table itself shown at 15 is preferably provided with a plurality of spaced transverse channel-ways indicated at 16 for receiving slidable clamping members 17 (Figure 4), to hold plates of glass, such as indicated at 18 in position on the table. This table is suitably mounted to a rock or swivel on a bar or rod 7.

The grinding mechanism

As shown in Figure 3 the back of the main frame carries the rigid horizontal support 19 for a pedestal 20 upon which is adjustably mounted a box 21 containing any suitable transmission elements intermediate a drive shaft 22 and a power take-off shaft 23 (Figure 3) for a grinding wheel or wheels 24. The box 21 will be vertically adjustable on the pedestal 20 in any suitable manner. For example, the pedestal may carry a rack engaged by a pinion (not shown) manually rotated through connection with an adjusting wheel 24x. Such adjusting devices are well known and do not require specific illustration or description. Shaft 22 carries a pulley 25 driven by a belt 26 from a drive pulley 27 on shaft 28, driven by motor 29.

Means for adjusting the table toward and from the grinding wheel

As shown in Figure 8, the table 15 carries a worm sleeve 30 engaged by a worm-shaft 31 which projects forwardly of the sub-frame 14 and which carries a crank handle 32. By rotating the crank handle, the table may be adjusted toward and from the grinding wheel 24 so as to assure proper engagement of the wheel with a glass plate G.

The table tilting and step by step movement

As shown in Figures 3, 4 and 5, a horizontal upper member of the sub-frame supports a motor 33 having a forwardly projected shaft 34. This shaft has mounted thereon a cam 35 rotating in a heart shaped opening at 36 in a slide block 37 movable vertically in opposed guideway members 38. Thus the opening 36 has projecting therein a high point of the slide block which is engaged by the cam 35 in its rotation. The slide block carries a threaded stub shaft 39 upon which is adjustably mounted a yoke 40 for a roller 41 which directly engages the front member of sub-frame 14. Thus, in each rotation of the cam 35 the table is raised and lowered to carry a glass plate held thereon out of or into engagement with the grinding wheel 24.

*The actuating and registration devices*

The front member of sub-frame 14 carries two racks. The rear rack 43 is a registration rack and the front rack 42 is a rack which is engaged for longitudinal movement of the table. In the latter action a lever 44 on shaft 34 will, in its rotation, approach rack 42 and will finally engage the same when the table has been upwardly tilted to carry the glass plate out of engagement with the grinding wheel. In its continued movement the lever 44 will move the table longitudinally so as to reposition the glass plate with respect to the grinding wheel. At this point the cam will leave the high point of slide block 37 and the latter will drop, thus bringing the table downward toward its former position and thereupon a pointed registration plate 45 will engage the sloping sides intermediate two of the teeth of rack 43 and will accurately register the sub-frame and hence the table and glass plate relatively to the grinding wheel.

*Means for varying pressure between the glass plate and grinding wheel*

As shown in Figures 2 and 7, the sub-frame 14 carries a worm shaft 46 which projects forwardly of the sub-frame and which carries a manual crank device 47. On the worm shaft is a weight 48 which is so formed as to be prevented from rotation by engagement with the sub-frame, this being indicated in Figure 2. Thus, by rotation of the worm shaft, the weight may be brought forwardly of the table to increase the pressure of the glass plate upon the grinding wheel, or the weight may be moved to the transverse center of the table so as to balance the table, since the table is mounted to rock or swivel on a bar or rod 7. Thus, if very rapid grinding with a deep cut is desired, the weight may be moved forwardly to increase the pressure of the glass plate upon the grinding wheel and vice versa.

In the operation of the machine any suitable grinding wheel or wheels may be mounted on shaft 23 for a single cut or a plurality of cuts. The glass plate is mounted upon the table and clamped into position in such manner that, when "punties" are to be formed, the marginal edge of the glass will engage the grinding wheel when the table is brought toward horizontal position and will be released from engagement by the grinding wheel when the table is tilted upwardly by the cam device above described.

The motors being set in motion, the table will be alternately lowered for the cutting operation, then raised at its front for release of the glass from the grinding wheel, then shifted a predetermined distance and again lowered for the cutting operation, this continuing until the work has been completed on one marginal edge of the glass plate. The glass plate may then be turned to present a fresh marginal edge of the grinding wheel and the work proceeded as before, after the table has been brought to initial position by its movement on the trackway.

I claim:

1. In an automatic machine for grinding glass, a frame, a trackway on the frame, a carriage on the trackway, a table, pivotal means between the carriage and the table whereby the latter may be tilted, a shaft adapted to carry a grinding element in register with the table, power means for imparting a step by step movement of the carriage relatively to said shaft, means for changing the tilt of the table intermediate said step by step movements, and means for increasing or decreasing the resistance of the table to said change in its tilt.

2. An automatic machine for grinding glass comprising in combination a sub-frame immediately carrying the glass-supporting table, a rack carried by the sub-frame, a fixed slideway, a cam block carried in the slideway and adapted for actuating the sub-frame to tilt the table, a cam adapted to actuate said cam block, a shaft for rotating the cam, and a member carried by said shaft and adapted to intermittently engage and impart movement to the rack.

3. An automatic machine for grinding glass comprising in combination with a sub-frame immediately carrying the table, a rack carried by the sub-frame, a fixed slideway, a cam block carried in the slideway and adapted for actuating the sub-frame to tilt the table, a cam adapted to actuate said cam block, a shaft for rotating the cam, a member carried by said shaft and adapted to intermittently engage and impart movement to the rack, a second rack having spaced V-shaped recesses, and a fixed wedge tipped registration bar for co-action with the walls of said recesses.

ADOLPH MARCHAND.

REFERENCES CITED

The following references are of record in the file of this patent:

UNITED STATES PATENTS

| Number | Name | Date |
|---|---|---|
| 1,138,515 | Todd | May 4, 1915 |
| 1,583,797 | Rehm | May 11, 1926 |
| 2,062,352 | Criner | Dec. 1, 1936 |
| 2,097,068 | Johnson | Oct. 26, 1937 |
| 2,151,204 | Hartman | Mar. 21, 1939 |
| 2,151,480 | Ludwig | Mar. 21, 1939 |
| 2,286,886 | Anderson | June 16, 1942 |